(12) United States Patent
Cheryauka et al.

(10) Patent No.: US 7,734,119 B2
(45) Date of Patent: Jun. 8, 2010

(54) METHOD AND SYSTEM FOR PROGRESSIVE MULTI-RESOLUTION THREE-DIMENSIONAL IMAGE RECONSTRUCTION USING REGION OF INTEREST INFORMATION

(75) Inventors: Arvidas Bronislavovich Cheryauka, Salt Lake City, UT (US); Vernon Thomas Jensen, Draper, UT (US)

(73) Assignee: General Electric Company, Schenectady, NY (US)

( * ) Notice: Subject to any disclaimer, the term of this patent is extended or adjusted under 35 U.S.C. 154(b) by 1464 days.

(21) Appl. No.: 10/945,770

(22) Filed: Sep. 21, 2004

(65) Prior Publication Data

US 2006/0061570 A1 Mar. 23, 2006

(51) Int. Cl.
*G06K 9/54* (2006.01)
(52) U.S. Cl. .................................... 382/302; 382/131
(58) Field of Classification Search ................ 600/407, 600/425; 382/285, 162–167, 128, 131, 154, 382/240, 302
See application file for complete search history.

(56) References Cited

U.S. PATENT DOCUMENTS

| 6,175,614 | B1 | 1/2001 | Jensen et al. | |
|---|---|---|---|---|
| 7,050,531 | B2 * | 5/2006 | Hebecker et al. | 378/8 |
| 7,167,180 | B1 * | 1/2007 | Shibolet | 345/474 |
| 7,302,286 | B2 * | 11/2007 | Camus et al. | 600/407 |
| 2001/0031920 | A1 * | 10/2001 | Kaufman et al. | 600/431 |
| 2002/0044696 | A1 | 4/2002 | Sirohey et al. | |
| 2003/0194119 | A1 | 10/2003 | Manjeshwar et al. | |

FOREIGN PATENT DOCUMENTS

| EP | 1 096 428 A1 | 2/2001 |
|---|---|---|
| WO | 02103639 A2 | 12/2002 |

OTHER PUBLICATIONS

Bonnet, Peyrin, Turjman, and Prost, "Multiresolution Reconstruction in Fan-Beam Tomography", IEE 0-7803-6503-8/01, pp. 15-105-15-109.

Gregor J. et al., "Fast Feldkamp Reconstruction Based on Focus of Attention and Distributed Computing," International Journal of Imaging Systems and Technology Wiley USA 12(6):229-234 (2002) ISSN: 0899-9457 XP002382269.

(Continued)

*Primary Examiner*—Long V Le
*Assistant Examiner*—Saurel J Selkin
(74) *Attorney, Agent, or Firm*—McAndrews, Held & Malloy, Ltd.; Peter J. Vogel; Michael A. Dellapenna

(57) ABSTRACT

The present invention provides a method and system for progressive multi-resolution three-dimensional image reconstruction using region of interest information. The method and system significantly reduces the amount of time required to display high quality three-dimensional fluoroscopic images by utilizing progressive multi-resolution image reconstruction techniques. In addition, by employing manual or automated selection of one or more regions of interest in which to focus the progressive image reconstruction, high quality 3D images of region(s) of interest may be obtained soon after image data acquisition.

23 Claims, 7 Drawing Sheets

OTHER PUBLICATIONS

Bonnet, Peyrin, Turjman, and Prost, "Nonseparable Wavelet-Based Cone-Beam Reconstruction in 3-D Rotational Angiography", IEEE Transactions on Medical Imaging, Mar. 2003, pp. 360-367, vol. 22, No. 3, IEEE.

Rodet, Grangeat, and Desbat, "Multichannel algorithm for fast 3D reconstruction", Phys. Med. Biol. 47 (2002), pp. 2659-2671, Institute of Physics Publishing.

Wiesent, Barth, Navab, Durlak, Brunner, Schuetz, and Seissler, "Enhanced 3-D-Reconstruction Algorithm for C-Arm Systems Suitable for Interventional Procedures", IEEE Transactions on Medical Imaging, May 2000, pp. 391-403, vol. 19, No. 5, IEEE.

* cited by examiner

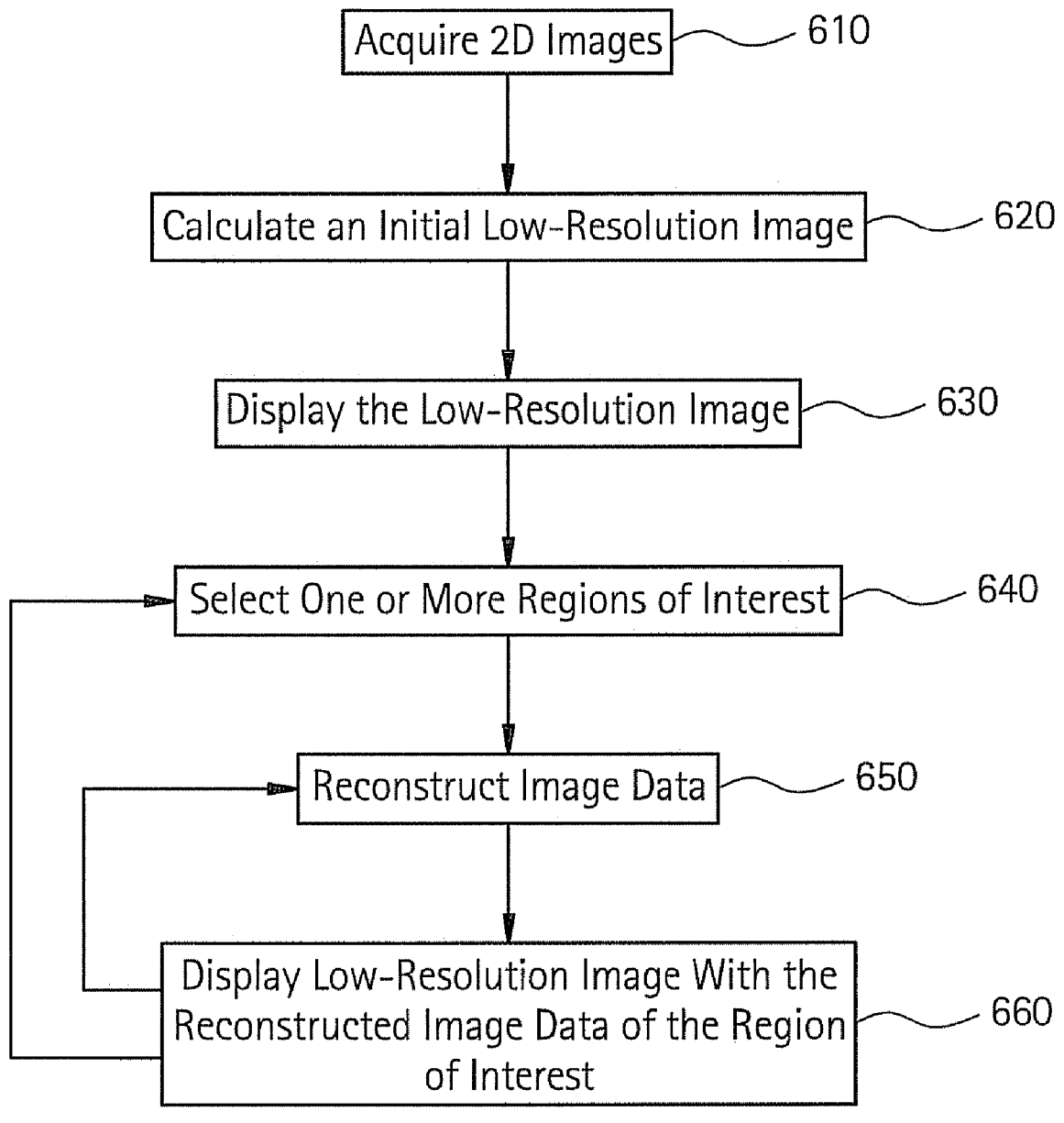

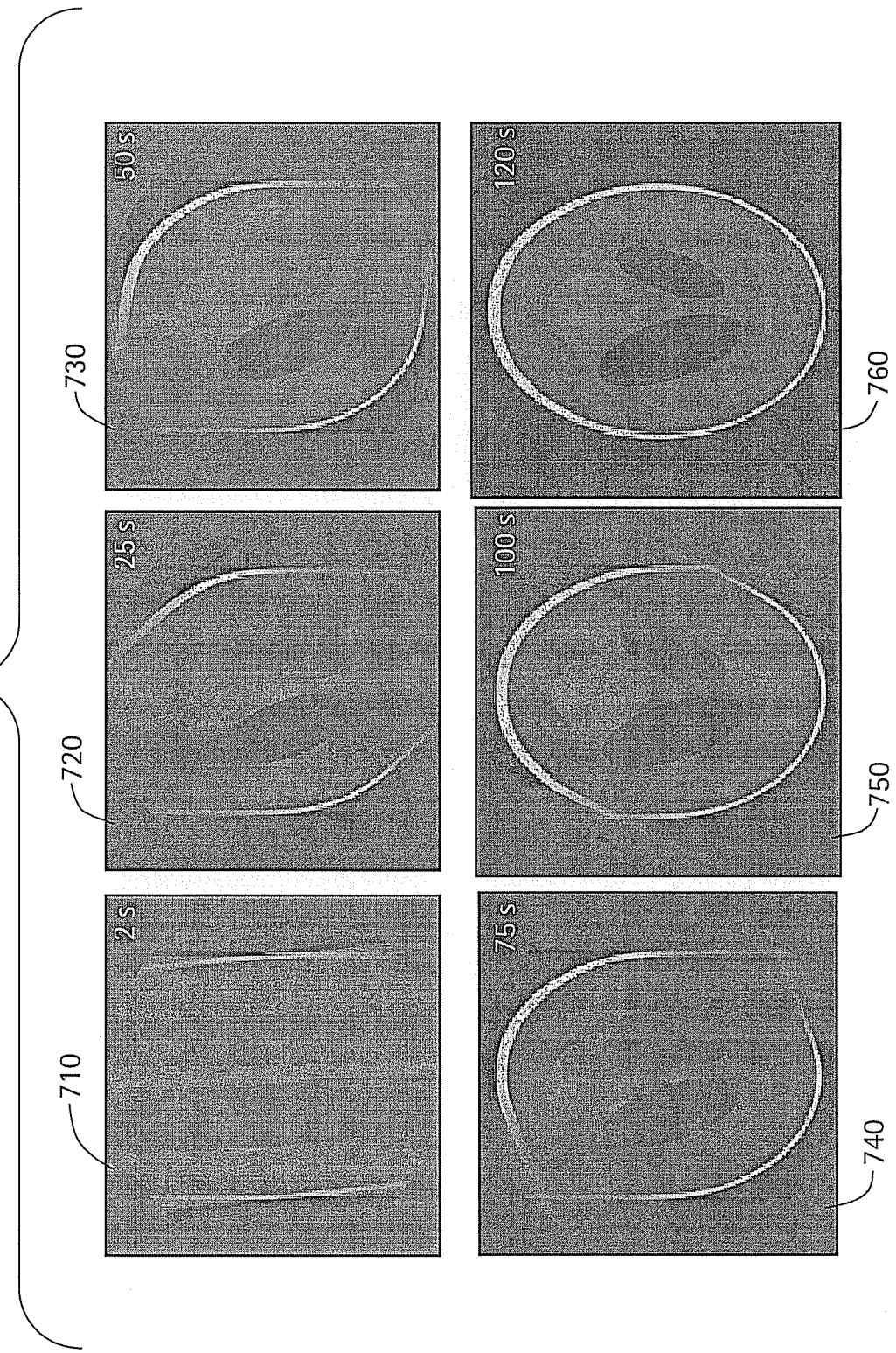

METHOD AND SYSTEM FOR PROGRESSIVE MULTI-RESOLUTION THREE-DIMENSIONAL IMAGE RECONSTRUCTION USING REGION OF INTEREST INFORMATION

BACKGROUND OF THE INVENTION

The present invention generally relates to three-dimensional ("3D") imaging. More specifically, the present invention describes a method and system for progressive multi-resolution three-dimensional fluoroscopic image reconstruction using automatic region of interest.

Two fields of medical imaging that require dynamic reconstruction include functional imaging and interventional imaging. Functional imaging can include, for example, positron emission tomography ("PET") and single photon emission computed tomography ("SPECT"). Interventional imaging can include, for example, fluoroscopic computer tomography ("Fluoro CT").

Modern medical imaging systems frequently employ mobile C-arm fluoroscopy systems to facilitate a variety of diagnostic and interventional radiological procedures. While these systems typically obtain two-dimensional ("2D") fluoroscopic grayscale images, more recent mobile and advanced fixed-room fluoroscopic systems have utilized computer tomography to create 3D images from a plurality of 2D images. These more recent systems increase the convenience and decrease the cost of obtaining 3D image scans at times before, during and after a medical procedure.

However, the value of these 3D fluoroscopic image scans is limited by some key factors, including interference with a workflow in an operating room. For example, the time required for set-up of the system, image data acquisition, and image reconstruction from a plurality of 2D images into 3D image data can, in many instances, offset any benefits derived from obtaining the 3D image data.

In addition, conventional 3D image reconstruction does not provide high quality image information for quite some time. For example, conventional 3D image reconstruction is conducted by updating 3D image information on a view-to-view basis. FIG. 7 illustrates a 3D image reconstructed on a view-to-view basis. FIG. 7 includes a progression of six images 710 through 760. Each image corresponds to a reconstructed 3D image after an amount of time listed in each image. For example, image 710 represents an image acquired, reconstructed and displayed after two seconds of image acquisition and reconstruction. Subsequent images represent images reconstructed with image data acquired after the display of the previous image. For example, image 720 represents image 710 updated with image data acquired after image 710 is displayed. In this way, images 720, 730, 740, 750, and 760 represent reconstructions of previous images as additional data is acquired and reconstructed. Such a procedure is known as image reconstruction on a view-by-view basis.

However, the updating of image information on a view-by-view basis includes several drawbacks. A major problem with such a procedure is the failure to provide any significant image detail and/or quality until all image data for the entire image view has been fully acquired and reconstructed, as apparent from FIG. 7. For example, no significant image detail is available until at least images 750 and 760. Approximately no image detail is available in previous images 710, 720, 730 and 740.

In addition, view-by-view updating causes strong aliasing artifacts to exist in the images up to the time when the very last fluoroscopic image projection within an angular range sufficient for complete image reconstruction is backprojected into the reconstructed image.

In addition, imaging modalities considered as "diagnostic imaging", such as CT, magnetic resonance ("MR") and radiography imaging, for example, obtain images that may not be reviewed for hours, days or even weeks after image acquisition. In contrast, mobile C-arm imaging systems are traditionally used for interventional imaging which can provide for near real-time acquisition and review of 2D fluoroscopic images. In an ideal situation, 3D tomographic image information would also be available in near real-time. However, until technology provides cost-effective solutions, a method and system for significantly reducing the amount of time required to calculate and display high quality 3D images is required. Such a need can be met by utilizing progressive multi-resolution image reconstruction techniques alone or in conjunction with a variety of manual and/or automated region-of-interest selection techniques, for example.

Thus, a need exists for a method and system for progressive multi-resolution three-dimensional image reconstruction using region of interest information. Such a method and system can provide for a significant reduction in the amount of time required to display high quality 3D image information. For example, such a method and system can provide for the commencement of progressive visualization of image reconstruction almost immediately after data acquisition is completed.

BRIEF SUMMARY OF THE INVENTION

The present invention provides for a method for progressive multi-resolution 3D image reconstruction. The method includes acquiring a plurality of input two-dimensional images, calculating an initial three-dimensional image based on at least one of the input images, where the initial three-dimensional image includes a plurality of voxels, and reconstructing the three-dimensional image data in a subset of the voxels to create a higher resolution three-dimensional image in a displayed image area corresponding to the voxel subset.

The present invention also provides a system for progressive multi-resolution 3D image reconstruction. The system includes an imaging modality and an image processing unit. The imaging modality acquires a plurality of two-dimensional images. The image processing unit performs the steps of: 1) calculating an initial three-dimensional image based on at least one of the input images, where the initial three-dimensional image includes a plurality of voxels, and 2) reconstructing the three-dimensional image data in a subset of the voxels to create a higher resolution three-dimensional image in an area of a displayed image corresponding to the voxel subset.

The present invention also provides a method for progressive fluoroscopic image reconstruction. The method includes acquiring a plurality of input two-dimensional images, calculating a three-dimensional image based on at least one of the input images, updating the three-dimensional image based on at least one other input image, where the updating occurs on a voxel-by-voxel basis, and displaying the three-dimensional image.

BRIEF DESCRIPTION OF SEVERAL VIEWS OF THE DRAWINGS

FIG. 6 illustrates a flowchart for a method for progressive multi-resolution three-dimensional image reconstruction using automatic region of interest according to an embodiment of the present invention.

FIG. 7 illustrates a 3D image reconstructed on a view-to-view basis.

Figure 1:
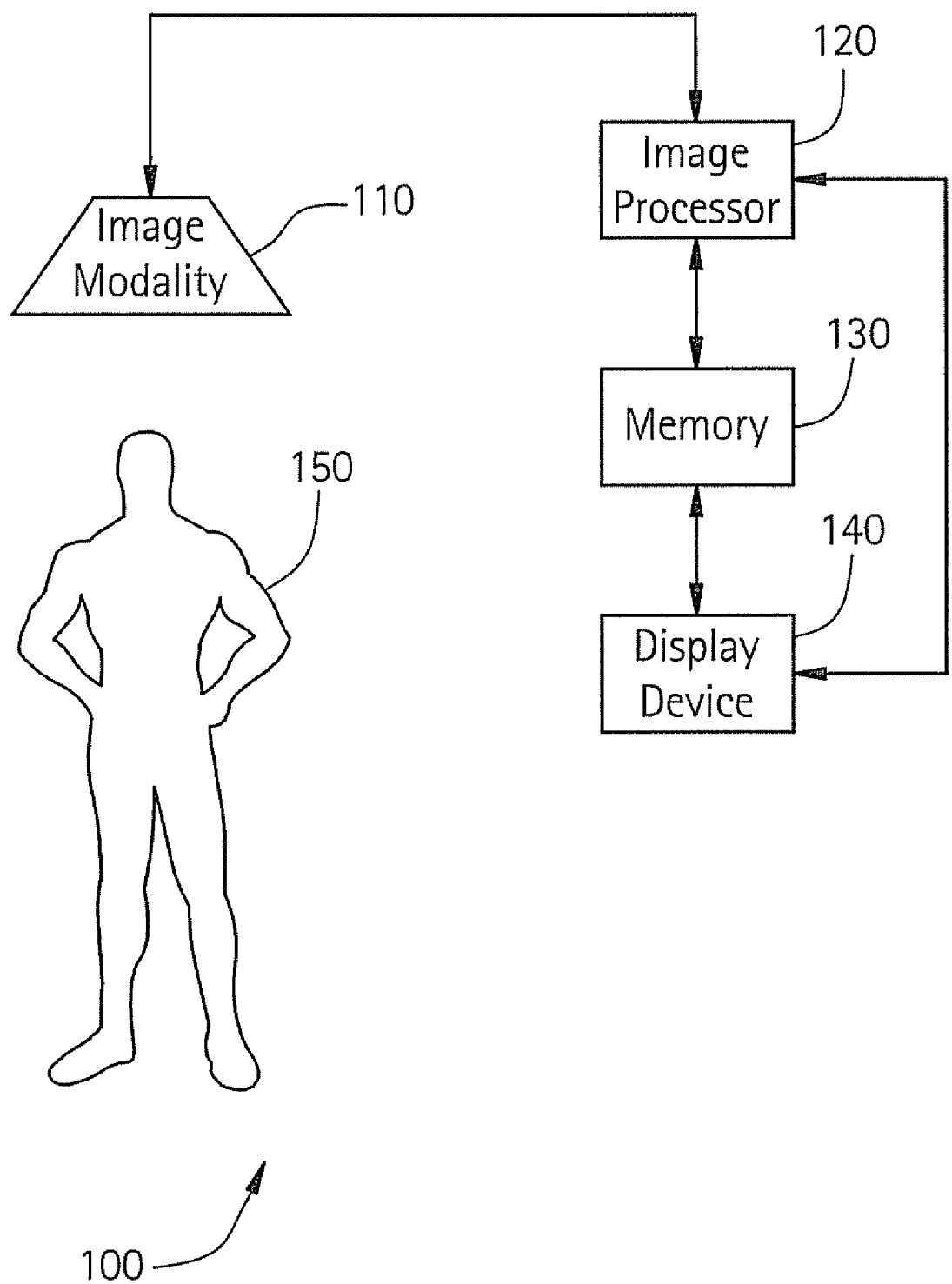
FIG. 1 illustrates an exemplary fluoroscopic imaging system used according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates an exemplary tomographic imaging system 100 used according to an embodiment of the present invention. System 100 includes an imaging modality 110, an image processor 120, and a display device 140. System 100 may also include a memory 130. System 100 can be employed to obtain tomographic images of a patient 150 and/or an anatomy of patient 150.

Imaging modality 110 can include any device or system capable of obtaining a plurality of images of patient 150 and/or anatomy of patient 150. For example, imaging modality 110 can include a mobile C-arm fluoroscopy system, where in operation, imaging modality 11 obtains a plurality of two-dimensional ("2D") fluoroscopic images of patient 150 and/or an anatomy of patient 150.

Imaging modality 110 obtains a plurality of two-dimensional images. In an embodiment of the present invention, the images may include fluoroscopic images. The two-dimensional images are communicated from imaging modality 110 to image processor 120 as input two-dimensional images. Image processor 120 can include any device or system capable of receiving 2D images from imaging modality 110 and constructing creating three-dimensional ("3D") images from a plurality of 2D images. For example, image processor 120 can include a real-time embedded image processor board to be corrected. The corrected 2D images are accumulated in a computer workstation (for example, a Linux computer) for the 3D image reconstruction and display.

Once one or more 3D images have been constructed, the 3D images can be communicated to one or more of memory 130 and display device 140. Memory 130 can then store the 3D images for later retrieval, processing, and/or display. Memory 130 can include any medium on which the 3D images can be stored. For example, memory 130 can include a computer hard drive or a RAM/flash memory.

Display device 140 can display one or more 3D images. Display device 140 can include, for example, a computer monitor or any other device capable of displaying a visual representation of a 2D and/or 3D image.

In another embodiment of the present invention, one or more of imaging modality 110, image processor 120, memory 130, and display device 140 can be embodied in a single physical unit. For example, one or more of imaging modality 110, image processor 120, memory 130, and display device 140 can be included in a mobile fluoroscopic CT unit.

Once image processor 120 receives a plurality of 2D images from imaging modality 110, processor 120 can reconstruct a 3D image based on at least the 2D images. Processor 120 can reconstruct the 3D image according to any method commonly known to those of ordinary skill in the art. For example, processor 120 can receive data representative of 190 $512^2$ 2D images useful to construct an initial low-resolution 3D image.

Processor 120 can first construct an initial low-resolution 3D image. For example, once processor 120 receives the 190 $512^2$ 2D images (as in the above example), processor 120 may calculate a very low resolution $64^3$ volume reconstruction of a whole field view of patient 150 and/or patient 150 anatomy in a few seconds.

The initial 3D image can include a plurality of volume samples, or voxels. A voxel can include, for example, a smallest distinguishable box-shaped part of a three-dimensional image. Each of the voxels can be of the same size in the initial 3D image.

Figure 2:
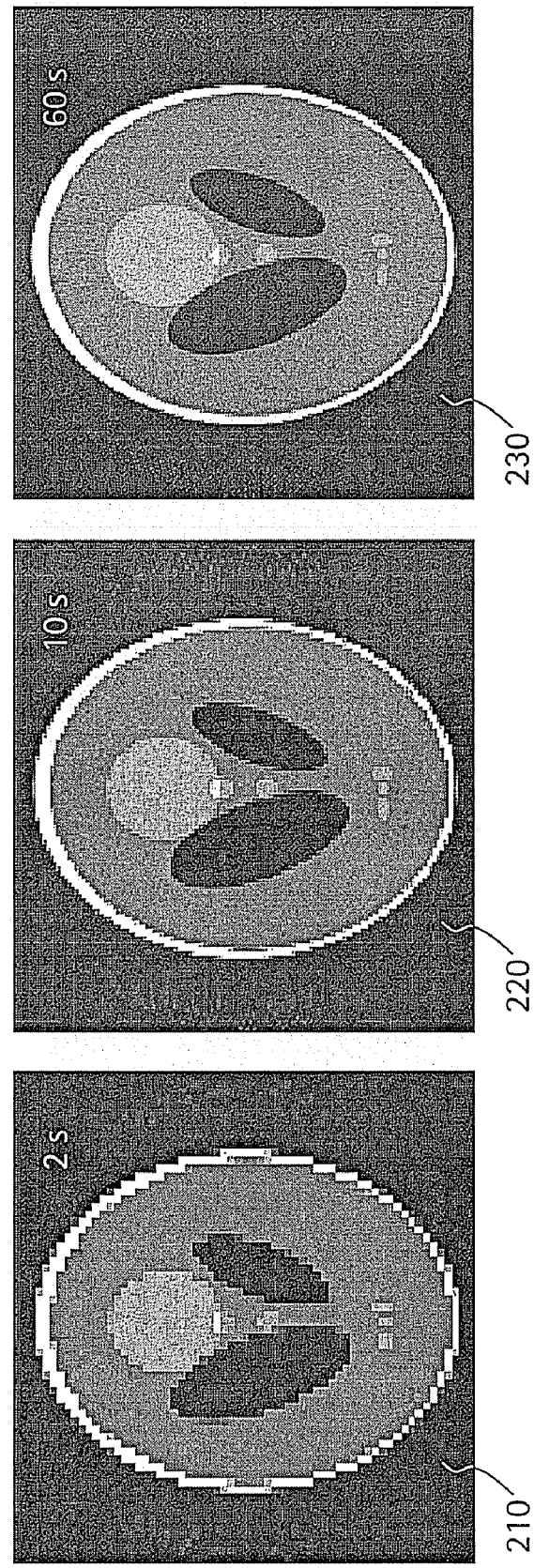
FIG. 2 illustrates an exemplary 3D image reconstructed using whole field-of-view multi-resolution progressive reconstruction according to an embodiment of the present invention.

Processor 120 may then employ whole field-of-view multi-resolution progressive reconstruction of a 3D image. FIG. 2 illustrates an exemplary 3D image 210, 220, 230 reconstructed using whole field-of-view multi-resolution progressive reconstruction according to an embodiment of the present invention. Image 210 represents an exemplary 3D initial image of low-resolution. Image 210 can include, for example, an initial low-resolution image calculated by processor 120 and displayed on device 140 after receiving all 2D image data obtained by imaging modality 110.

Processor 120 may then reconstruct image 210 into image 220. Image 220 can include, for example, a medium-resolution image calculated by processor 120 and displayed on device 140 using 2D image data obtained by imaging modality 110. In order to increase the resolution of the displayed image from image 210 to image 220, processor 120 may decrease the voxel size used in image 220 from the voxel size in image 210, for example.

Similarly, processor 120 may then reconstruct image 220 into image 230. Image 230 can include, for example, a high-resolution image calculated by processor 120 and displayed on device 140 using all 2D image data obtained by imaging modality 110. In order to increase the resolution of the displayed image from image 220 to image 230, processor 120 may decrease the voxel size used in image 230 from the voxel size in image 220, for example.

In another embodiment of the present invention, processor 120 may also denoise low resolution images (such as illustrated as image 210 in FIG. 2) by applying additional filtering of the input 2D images. For example, processor 120 may apply additional downsampling of input projections using denoising window techniques.

In another embodiment of the present invention, processor 120 may reconstruct an area of a low-resolution 3D image to create a higher-resolution 3D image within the low-resolution image. For example, processor 120 may reconstruct one or more areas of an initial image into image areas with higher resolution.

Processor 120 may reconstruct the area by reconstructing one or more subsets of all voxels in the initial 3D image. For example, processor 120 may only reconstruct a subset of voxels in a low-resolution image in order to create an area of higher resolution image corresponding to the reconstructed voxel subset. The reconstruction of the 3D image may be conducted by updating on a voxel-by-voxel basis instead of by updating the 3D image on a projection view basis. Updating the image dataset on a voxel basis can occur, for example, by increasing the image resolution while maintaining the same contrast and noise level, for example. However, updating the image dataset on a voxel basis can include altering one or more of the contrast and noise level, for example.

The area of reconstruction may include, for example, a region of interest. A region of interest may include one or more of a patient 150 anatomy, a medical instrument, a medical implant, an image region of higher clinical value, and an image region including a smaller image distortion perspective, for example. An image region of higher clinical value can include an area of the initial image that is of greater interest to a surgeon or physician for any reason.

In an embodiment of the present invention, the region of interest is selected manually. The region of interest may be selected, for example, by a user input into image processor 120. A user may also select one or more regions of interest by indicating the region(s) of interest on an initial image displayed on device 140, for example.

In another embodiment of the present invention, one or more regions of interest are selected automatically. The region of interest may be automatically selected, for example, by locating a region of interest in a center of the initial low-resolution image. The region of interest may also be automatically selected, for example, by determining an image area containing one or more representations of anatomical mass of patient 150. In addition, the region of interest may be automatically selected based on at least an estimate of an S-distortion correction. An S-distortion correction may include a correction of image intensity and texture intended to reduce the effect of an external magnetic field on a displayed image, for example.

In another embodiment of the present invention, one or more of the manual or automatic selection of a region of interest may be based on at least one of a priori and in theater-updated information. A priori information includes information available to a user of system 100 prior to commencement of a medical procedure employing one or more embodiments of the present invention. In theater information includes information that does not become available to a user of system 100 until after commencement of a medical procedure employing one or more embodiments of the present invention.

Figure 3:
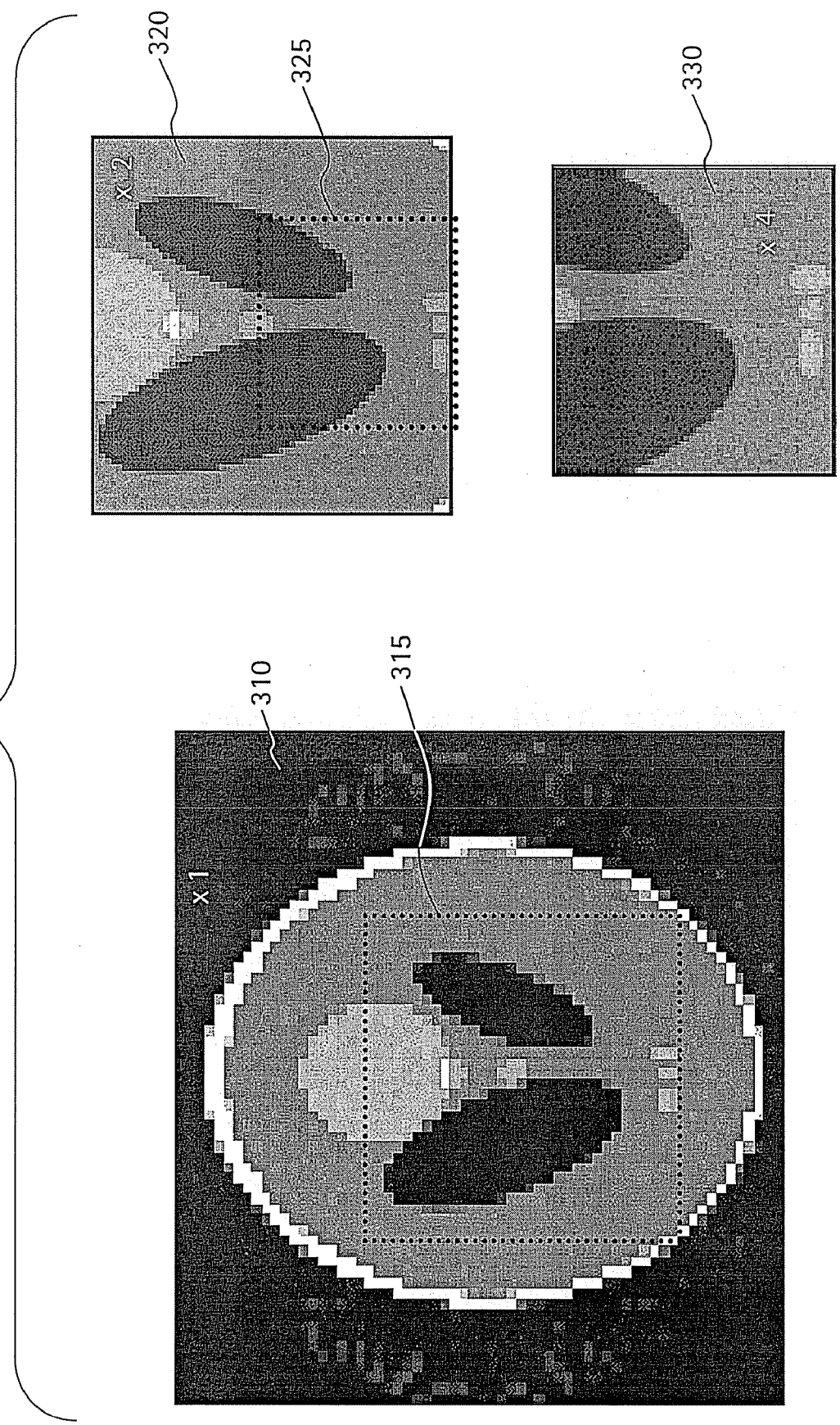
FIG. 3 illustrates region of interest-based multi-resolution construction of an initial low-resolution image according to an embodiment of the present invention.

FIG. 3 illustrates region of interest-based multi-resolution construction of an initial low-resolution image according to an embodiment of the present invention. FIG. 3 illustrates an initial low-resolution image 310 including a first region of interest 315, a second medium-resolution image 320 including a second region of interest 325, and a high-resolution image 330. As described above, initial image 310 may be calculated by processor 120 and based on at least a plurality of 2D images. Initial image 310 may then be presented to a user on display device 140. Region of interest 315 has been selected, as indicated by the dashed line box in image 310.

Figure 4:
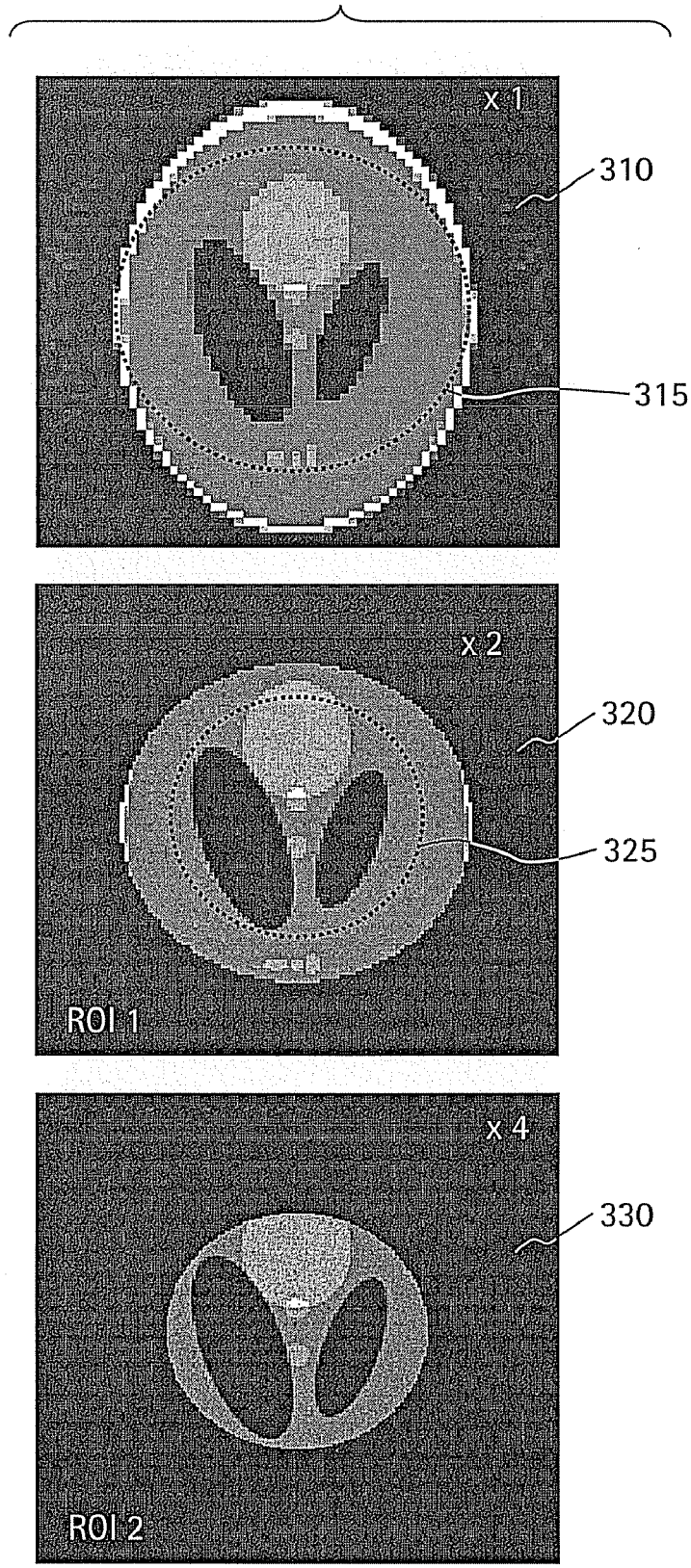
FIG. 4 illustrates the three images and two regions of interest as circular in shape according to an embodiment of the present invention.

While a single region of interest 315 and 325 is displayed in each of images 310 and 320, an image may include additional regions of interest. In addition, while regions of interest 315 and 325 are square shaped in images 310 and 320, a region of interest may include any shape, including but not limited to a circle, rectangle, triangle, oval, or any other geometric shape, for example. For example, FIG. 4 illustrates the three images 310, 320 and 330 and two regions of interest 315 and 325 as circular in shape according to an embodiment of the present invention.

After region of interest 315 is selected, processor 120 may reconstruct the area of image 310 included in region of interest 315 to create image 320. For example, processor 120 may reconstruct the image data associated with the voxels included in region of interest 315 to form a medium-resolution image 320. In this way, a surgeon is able to first select a region of interest 315 in an initial low-resolution image 310 and then view a higher resolution image 320 that includes the selected region of interest 315. As the entire field-of-view of initial image 310 is not being reconstructed (and only the region of interest 315 is), the processing time and power required of processor 120 can be greatly decreased, for example.

After image 320 is presented on display device 140, a region of interest 325 is selected, as indicated by the dashed line box in image 320. After region of interest 325 is selected, processor 120 may reconstruct the area of image 320 included in region of interest 325 to create high-resolution image 330. For example, processor 120 may reconstruct the image data associated with the voxels included in region of interest 325 to form image 330. In this way, a surgeon is able to first select a region of interest 325 in medium-resolution image 320 and then view a high resolution image 330 that includes the selected region of interest 325. Once again, as the entire field-of-view of image 320 is not being reconstructed (and only the region of interest 325 is), the processing time and power required of processor 120 can be greatly decreased, for example.

In an embodiment of the present invention, the number of voxels included in images 310, 320 and 330 may be equivalent. For example, image 320 can include the same number of voxels as image 310, but in a smaller image area. Therefore, image 320 can include double spatial resolution as compared to image 310, for example. Similarly, image 330 can include the same number of voxels as image 320, but in a smaller image area. Therefore, image 330 can include double spatial resolution as compared to image 320 and quad spatial resolution as compared to image 310.

If the number of voxels is approximately equivalent in images 310, 320 and 330, then the processing time and power required of processor 120 may be approximately equivalent for the reconstruction of image 320 from image 310, and of image 330 from image 320, for example.

In another embodiment of the present invention, images 310 and 320 may include differing numbers of voxels. For example, instead of displaying a selected region of interest without the remainder of an initial image, as in images 320 and 330 of FIGS. 3 and 4, system 100 may cause a lower-resolution image to be displayed along with an internal image area of higher-resolution. The higher-resolution image area can correspond to a region of interest.

Figure 5:
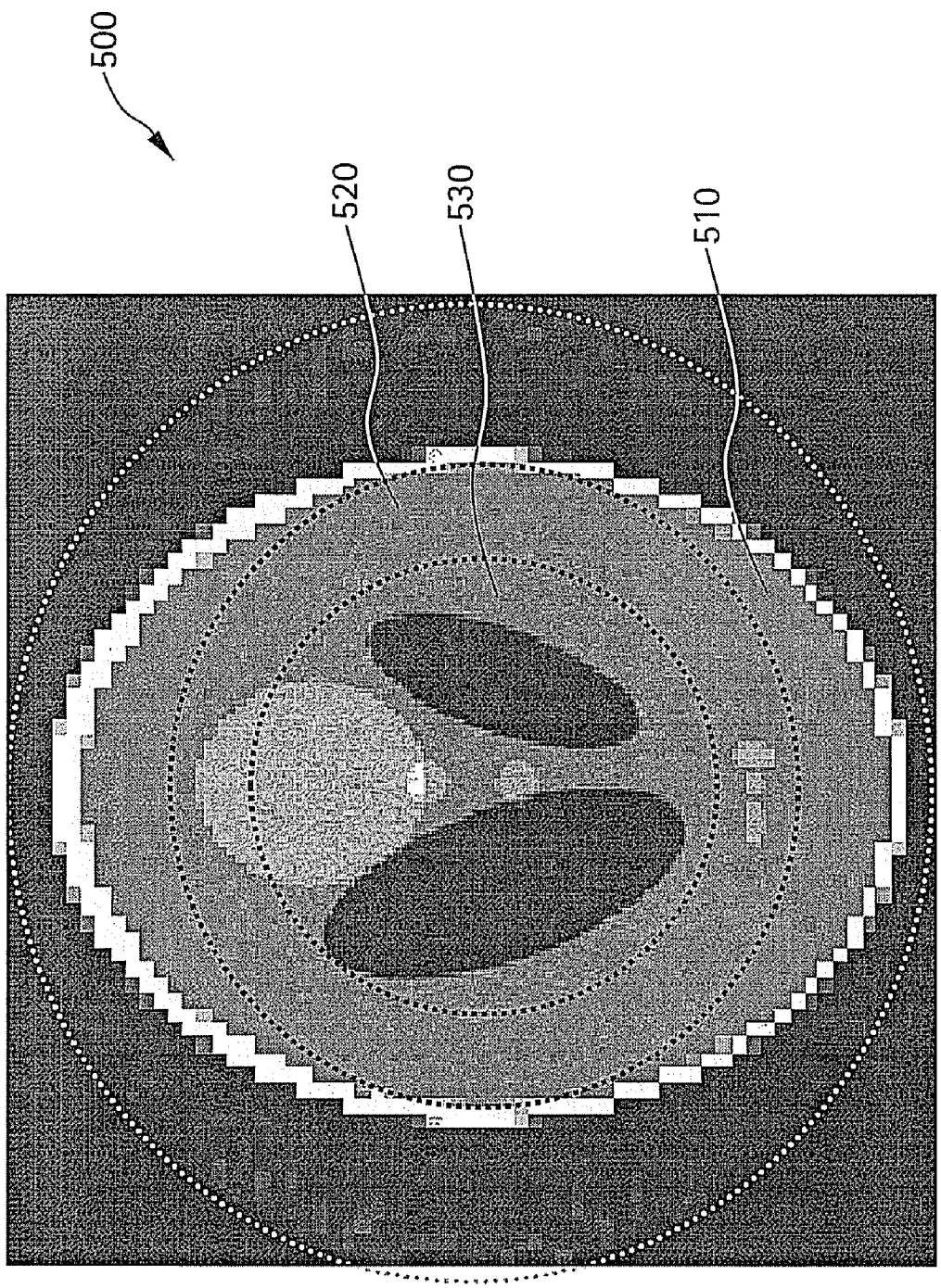
FIG. 5 illustrates a lower-resolution image that includes two regions of interest and a remainder image area according to an embodiment of the present invention.

FIG. 5 illustrates a lower-resolution image 500 that includes two regions of interest 520, 530 and a remainder image area 510 according to an embodiment of the present invention. Remainder image area 510 includes areas of image 500 exclusive of regions of interest 520 and 530. Remainder image area 510 can include lower-resolution image data, such as image data corresponding to an initial image, as described above.

Once a region of interest 520 is selected, processor 120 can reconstruct a subset of voxels (corresponding to the region of interest) to produce a region of interest 520 including a higher-resolution image. As illustrated in FIG. 5, the image area demarked as region of interest 520 includes greater contrast and increased resolution as compared to the remainder 510 of image 500 area.

As shown in FIG. 5, there can be a plurality of regions of interest 520, 530 in an image 500. The regions of interest 520, 530 can have the same level of resolution, or, as illustrated in FIG. 5, the regions of interest 520, 530 can have differing levels of resolution (as region 530 has a higher resolution than both region 520 and image remainder 510), for example. By having higher resolution reconstruction occurring first in an area of high interest (such as a region of interest), for example, while allowing lower resolution reconstruction to occur in areas of lower interest (such as other image areas), processing speed of 3D image data can be effectively sped up in areas of higher interest.

In another embodiment of the present invention, one or more regions of interest and/or image areas of higher resolution can increase in one or more of size and resolution. For example, after an initial low-resolution image has been calculated and displayed, varying levels and regions of higher resolution reconstruction can continue to progressively "spread" or "grow" from an initial region of interest until the entire image area is eventually at maximum resolution. For example, an initial image may include the same low-resolution image quality throughout the image area. Once a region of interest is selected, processor 120 can alter the size of the voxels and/or reconstruct image data associated with voxels included in the region of interest (as described above) in order to create a region of interest with higher-resolution than the initial low-resolution image. The initial low-resolution image may be displayed along with the higher-resolution region of interest.

Processor 120 may then proceed to increase one or more of the size and resolution of the region of interest. For example, processor 120 may continue to process image data associated with voxels of the region of interest in order to further increase the resolution of the displayed region of interest. In addition, processor 120 may begin to process image data associated with voxels adjacent to the region of interest in order to further increase the respective resolution of image areas adjacent to the region of interest.

In this way, the present invention can satisfy a clinical need for near-real-time high-resolution image information while providing uniform high-resolution information across all image areas over a longer period of time, such as one to two minutes, for example. Such a clinical need may exist where a surgeon desires to obtain full image detail on a structure, point or region of interest during an interventional procedure while keeping a low-resolution image overview of the location of the structure, point or region in the 3D image.

The amount of time saved by employing the present invention can depend directly upon a volumetric size of one or more regions of interest. For example, an amount of image reconstruction time saved by employing the present invention can be proportional to:

$$t = k_1^3 \log(k_1) - k_2^3 \log(k_2) \tag{1}$$

where t is a factor proportional to an amount of time and $k_1$ and $k_2$ are an image field-of-view and a region of interest sides and/or radii for cubic and/or spherical regions of interest volumes, respectively.

In another embodiment of the present invention, additional image processing occurs only for image data associated with one or more regions of interest. For example, the reduction of beam hardening, scatter, metal and/or motion artifacts in image data by processor 120 can occur only for image data associated with a region of interest. By limiting the additional processing of image data to a region of interest, image processing time and power may be greatly reduced over similar processing for an entire image field of view.

FIG. 6 illustrates a flowchart for a method 600 for progressive multi-resolution three-dimensional image reconstruction using automatic region of interest according to an embodiment of the present invention. First, at step 610, a plurality of 2D images is acquired, as described above. Next, at step 620, an initial low-resolution image is calculated based on at least one of the 2D images, also as described above.

Next, at step 630, the low-resolution image is displayed. At step 640, one or more regions of interest in the low-resolution image are selected. As described above, the region(s) of interest may be selected manually or automatically. Next, at step 650, image data corresponding to voxels of the region(s) of interest is reconstructed on a voxel-by-voxel basis to create a higher-resolution image in the image area corresponding to the region(s) of interest, as described above. At step 660, the low-resolution image with the high-resolution image of the region(s) of interest is displayed.

In another embodiment of the present invention, after step 660, method 600 proceeds to step 640, where one or more additional regions of interest are selected based on at least the low-resolution image with high-resolution image area corresponding to a region of interest being displayed at step 660. For example, after a first region of interest is selected and the corresponding image data is reconstructed, additional regions of interest may then be selected.

In another embodiment of the present invention, after step 660, method 600 proceeds to step 650, where image data corresponding to the selected region(s) of interest is further reconstructed to increase, for example, a resolution of the image data. For example, as described above, the image data corresponding to the region(s) of interest may be repeatedly reconstructed and displayed.

In another embodiment of the present invention, after step 660, method 600 proceeds to step 650, where image data corresponding to the selected region(s) of interest is further reconstructed to increase, for example, a resolution of the image data. In addition, image data corresponding to image areas adjacent to the region(s) of interest are also reconstructed to increase, for example, a resolution of the image data. In this way, as described above, varying levels and regions of higher resolution reconstruction can continue to progressively "spread" or "grow" from an initial region(s) of interest until the entire image area is eventually at maximum resolution.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A method for progressive multi-resolution 3D image reconstruction, said method including:
   acquiring a plurality of input two-dimensional images;
   calculating an initial three-dimensional image based on at least one of said input images, said initial three-dimensional image including a plurality of voxels, and
   reconstructing three-dimensional image data in a subset of said voxels of said initial three-dimensional image to create a higher resolution three-dimensional image in a displayed image area corresponding to said voxel subset.

2. The method of claim 1, wherein said input images each include image data for a two dimensional image.

3. The method of claim 1, wherein said initial three-dimensional image is a low-resolution image.

4. The method of claim 1, wherein said reconstructing step includes updating said three-dimensional image data in each of said voxels included in said subset on a voxel-by-voxel basis.

5. The method of claim 1, wherein said higher resolution three-dimensional image includes a higher resolution image than said initial three-dimensional image.

6. The method of claim 1, where said subset of voxels includes a region of interest.

7. The method of claim 6, wherein said region of interest includes at least one of a patient anatomy, a medical instrument, a medical implant, an image region of higher clinical value than a remainder of said image, and an image region including a smaller image distortion perspective.

8. The method of claim 1, further including automatically determining said voxel subset based on at least one or more of a center of said initial image, an anatomical mass, and an S-distortion correction.

9. The method of claim 1, further including progressively increasing a size of said voxel subset.

10. The method of claim 1, wherein said input images are fluoroscopic images.

11. A system for progressive multi-resolution 3D image reconstruction, said system including:
    an imaging modality acquiring a plurality of input two-dimensional images; and
    an image processing unit performing the steps of:
        calculating an initial three-dimensional image based on at least one of said input images, said initial three-dimensional image including a plurality of voxels, and
        reconstructing three-dimensional image data in a subset of said voxels of said initial three-dimensional image to create a higher resolution three-dimensional image in an area of a displayed image corresponding to said voxel subset.

12. The system of claim 11, wherein said input images each include image data for a two dimensional image.

13. The system of claim 11, further including a display device displaying said initial three-dimensional image.

14. The system of claim 11, wherein said reconstructing step includes updating said three-dimensional image data in each of said voxels included in said subset on a voxel-by-voxel basis.

15. The system of claim 11, wherein said higher resolution three-dimensional image includes a higher resolution image than said initial three-dimensional image.

16. The system of claim 11, where said subset of voxels includes a region of interest.

17. The system of claim 16, wherein said region of interest includes at least one of a patient anatomy, a medical instrument, a medical implant, an image region of higher clinical value than a remainder of said image, and an image region including a smaller image distortion perspective.

18. The system of claim 11, wherein said image processing unit automatically determines said voxel subset based on at least one or more of a center of said initial image, an anatomical mass, and an S-distortion correction.

19. The system of claim 11, wherein said image processing unit progressively increases a size of said voxel subset.

20. The system of claim 11, wherein said input images are fluoroscopic images.

21. A method for progressive fluoroscopic image reconstruction, said method including:
    acquiring a plurality of input two-dimensional images;
    calculating an initial three-dimensional image based on at least one of said input images;
    reconstructing a three-dimensional image in a subset of said voxels of said initial three-dimensional image to create a higher resolution three-dimensional image in an area of a displayed image corresponding to said voxel subset;
    updating said higher resolution three-dimensional image based on at least one other input image, said updating occurring on a voxel-by-voxel basis; and
    displaying said updated higher resolution three-dimensional image.

22. The method of claim 21, further including automatically selecting a region of interest, wherein said updating step occurs only for a set of voxels corresponding to said region of interest.

23. The method of claim 21, further including automatically selecting a region of interest, wherein said updating step progressively spreads from a set of voxels corresponding to said region of interest to a remainder of said three-dimensional image.

* * * * *